(12) United States Patent
Upmeyer

(10) Patent No.: US 7,226,178 B2
(45) Date of Patent: Jun. 5, 2007

(54) LAMP FOR AN UNDERWATER CAMERA

(76) Inventor: Arnold Upmeyer, Basserman Weg 15, Berlin (DE) 12207

( * ) Notice: Subject to any disclaimer, the term of this patent is extended or adjusted under 35 U.S.C. 154(b) by 0 days.

(21) Appl. No.: 11/005,475

(22) Filed: Dec. 7, 2004

(65) Prior Publication Data

US 2006/0018113 A1    Jan. 26, 2006

(30) Foreign Application Priority Data

Apr. 8, 2004    (DE) ...................... 10 2004 018 439

(51) Int. Cl.
*G03B 15/02* (2006.01)

(52) U.S. Cl. .................. 362/11; 362/158; 362/253; 396/28; 396/182

(58) Field of Classification Search ............. 362/11, 362/158, 253; 396/28, 182
See application file for complete search history.

(56) References Cited

U.S. PATENT DOCUMENTS 5,010,412 A * 4/1991 Garriss ....................... 348/371
5,142,299 A * 8/1992 Braun ........................... 396/28
5,580,163 A * 12/1996 Johnson, II ................. 362/285

FOREIGN PATENT DOCUMENTS

| DE | 1 737 670 | 1/1957 |
|---|---|---|
| DE | 41 42 223 | 7/1993 |
| DE | 198 27 102 | 12/1999 |

\* cited by examiner

*Primary Examiner*—Sandra O'Shea
*Assistant Examiner*—Jason Moon Han
(74) *Attorney, Agent, or Firm*—Daniel S. Song; Nixon Peabody, LLP

(57) ABSTRACT

A lamp for an underwater camera to illuminate and photograph or film objects in the macrorange including a minimum of three LED diodes that emit white light which are arranged concentrically and at the same distance from each other around, and at a specific angle to, the optical axis of an underwater camera. An annular lamp holder may be used or the lamps may be directly integrated into the housing of the camera.

19 Claims, 5 Drawing Sheets

LAMP FOR AN UNDERWATER CAMERA

BACKGROUND OF THE INVENTION

1. Field of the Invention

This invention relates to a lamp for an underwater camera for lighting and photographing and filming in the macrorange.

2. Description of the Related Art

It often takes a tremendous effort to shoot high-quality pictures or films under water because of its natural turbidity due to particles and microorganisms dissolved or floating in the water. The particles dissolved or floating in the water are present at such a high density that it is very difficult to obtain shots that show true colors and are in focus even if the camera is located very close to the object to be photographed, for example, an animal at a range of up to 12 inches.

Various proposals have been made to supply clean water to the area in front of the camera to prevent the disadvantages of water turbidity and be able to shoot high-definition, true color photographs. DE 41 42 223 or DE 17 37 670, for example, describe an engineering solution based on this principle. However, underwater cameras designed like that are primarily intended for industrial photography and require considerable extra equipment. Such sophisticated and expensive cameras are not suited for skin and scuba divers that want to photograph plants and animals.

Handheld underwater lamps featuring at least one halogen lamp as a light source as described, for example, in DE 198 27 102 are frequently used for filming and photographing under water; the light is to compensate for any color distortion of the object to be photographed or filmed due to the blue cast the water has. Such underwater lamps are either rather bulky and heavy or do not have the required luminous intensity. In addition, shots taken while lighting the object with a halogen lamp are not sharply defined as the underwater lamp produces shadows and the light is reflected by the particles and, microorganisms in the water. The underwater camera housed in a casing with a window known from the above-mentioned DE 41 42 223 has two directionally adjustable lighting means attached to the sides of the housing for illuminating the object to be photographed. This underwater camera design is big, bulky, and expensive. Its power consumption is high, and the object can only be illuminated for producing sharply defined and true color shots because of complicated and costly flushing with clean water. Using the conventional underwater lamps for shooting photos and films involving animals has the disadvantage that some animals flee when the light is switched on, which makes shots in the macrorange quite difficult.

BRIEF SUMMARY OF THE INVENTION

It is the problem of this invention to create a lamp for an underwater camera that is compact in size, has a low power consumption, and provides high-definition, true color photographs or film takes in the macrorange under water.

This problem is solved according to the invention by the lamp for an underwater camera comprising the characteristics described in claim 1. The dependent claims disclose further characteristics and advantageous improvements of the invention.

In other words, it is the concept of the invention to arrange a minimum of three LED lamps concentrically and at the same distance from each other around the optical axis of the camera with a specific inclination towards the optical axis. The LED lamps that generate white light are mounted to, or installed in, an annular lamp holder so that the lamp can be attached to the camera, such as using a clamping device, as a separate accessory around the front window of the camera housing. It is also conceivable to integrate the LED lamps directly into the camera housing.

A lamp of this design can produce color neutral daylight at a color temperature of about 5,500° K. The inclination of the LED lamps towards the optical axis focuses the light volume on the macrorange so that the depth of field of the shots is improved and reduces reflection of the light irradiated in the water from particles in the water so that definition and color quality of the shots are considerably increased. As the dimensions of the lamp are rather small according to the design of the invention, a high irradiance can be achieved in a limited illuminated space. The great luminous angle of the LED lamps and the resulting even intermixture of irradiated light facilitate a virtually shadow-free illumination of the objects to be photographed in the macrorange. The small dimensions make it possible to use the underwater camera combined with the lamp according to the invention where space is limited, such as in narrow gaps and small caves under water. Among other advantages are low power consumption and the resulting long operating time, shockproof design, and easy handling. Existing cameras can easily be retrofitted with the lamp according to the invention. The camera can also be used when the lamp is separated from it. When filming or photographing animals under water, another beneficial effect of the lamp according to the invention is that the animals remain in the dome of light when the light is switched on because they naturally flee from the bright light into the dark, here towards the dark front window. The lamp, as it were, captures the animal and allows high-quality shots over a longer period of time. The lamp according to the invention has been described as yet in conjunction with underwater cameras. However, it can in general be used with conventional cameras as well.

In an advantageous embodiment of the invention, the LED lamps are arranged on or in the annular lamp holder (holding ring) at an angle of about 45° to the optical axis. The maximum illumination angle of one LED lamp is 140°. The number of LED lamps preferably is between three and eight.

According to another characteristic of the invention, the light-emitting diodes for the LED lamps are arranged on a cooling element, preferably on a cooling plate that is connected to a heat-conducting housing part. This housing part can be an aluminium lamp body that is fastened to the outer side of a holding ring. A cooling paste can be applied between the cooling plate and the housing part.

According to yet another characteristic of the invention, the annular lamp holder is designed as a hollow holding ring into which the LED lamps are integrated. In this case, the cooling element is connected with a lid made of heat-conducting material for further heat dissipation.

In an advantageous improvement of the invention, a single long-range LED lamp that contains means for focusing the emitted light can be connected to the annular lamp holder with LED lamps attached to its outside or installed inside it.

In another improvement of the invention, the LED lamps are connected to a dimming device and get their power from a constant-current source.

An embodiment of the invention is explained in greater detail below with reference to the figures. Wherein:

DETAILED DESCRIPTION OF THE INVENTION

Figure 1:
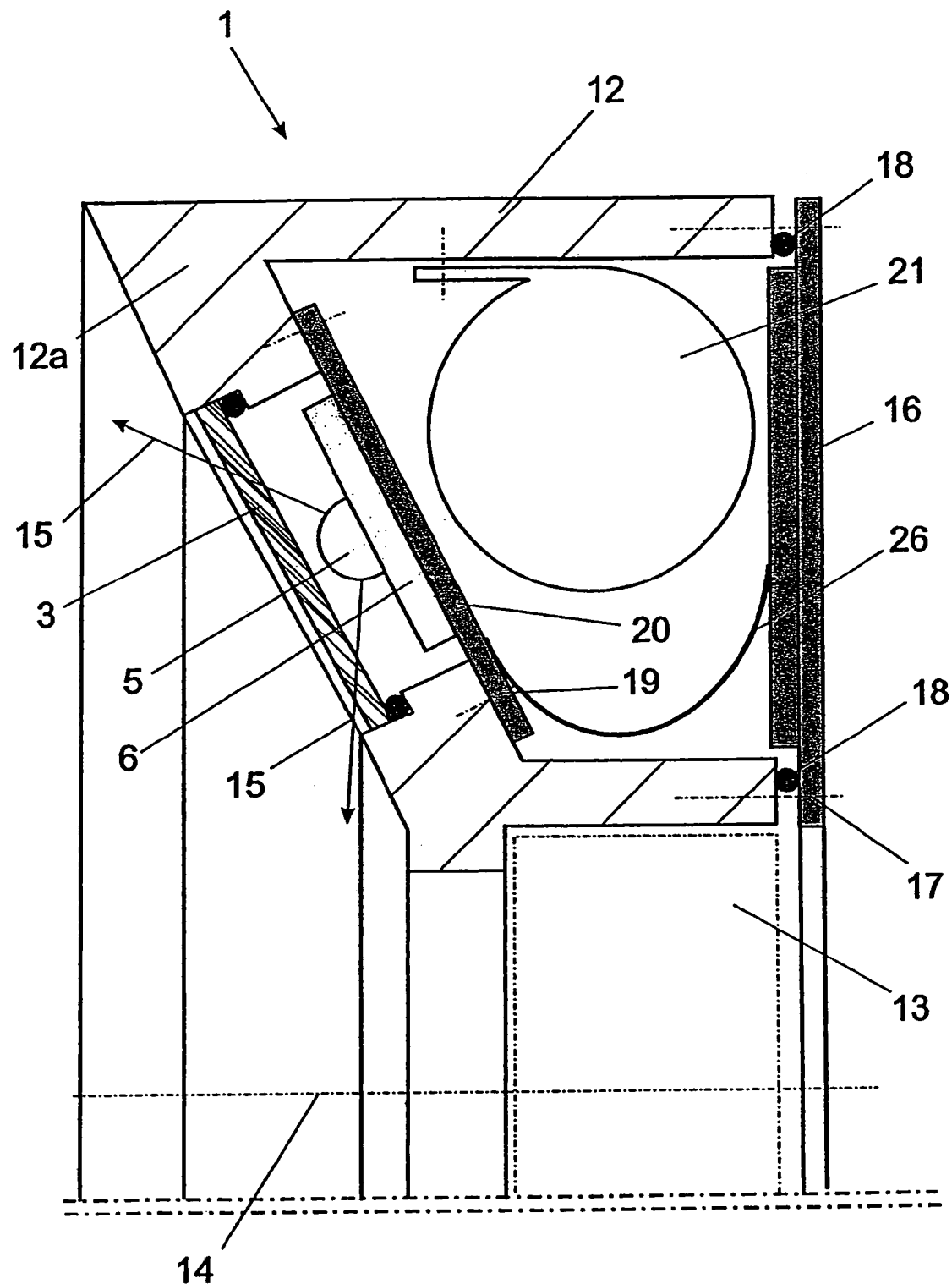
FIG. 1 shows a partial sectional view of a macro-LED underwater lamp that includes a hollow ring with integrated LED lamps that is attached to the front side of a camera housing.
Figure 2:
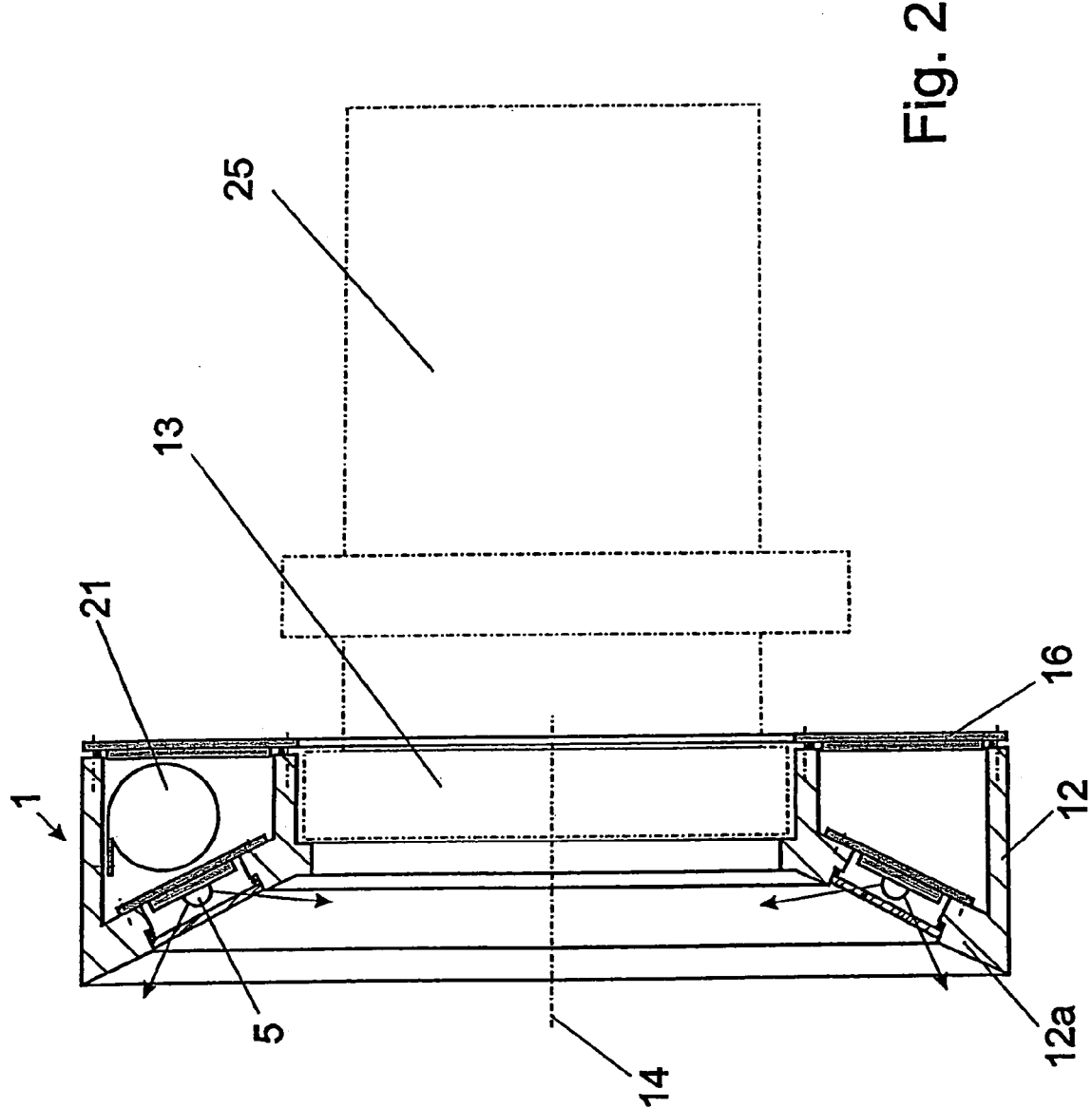
FIG. 2 shows a complete sectional view of the underwater lamp according to FIG. 1.
Figure 4:
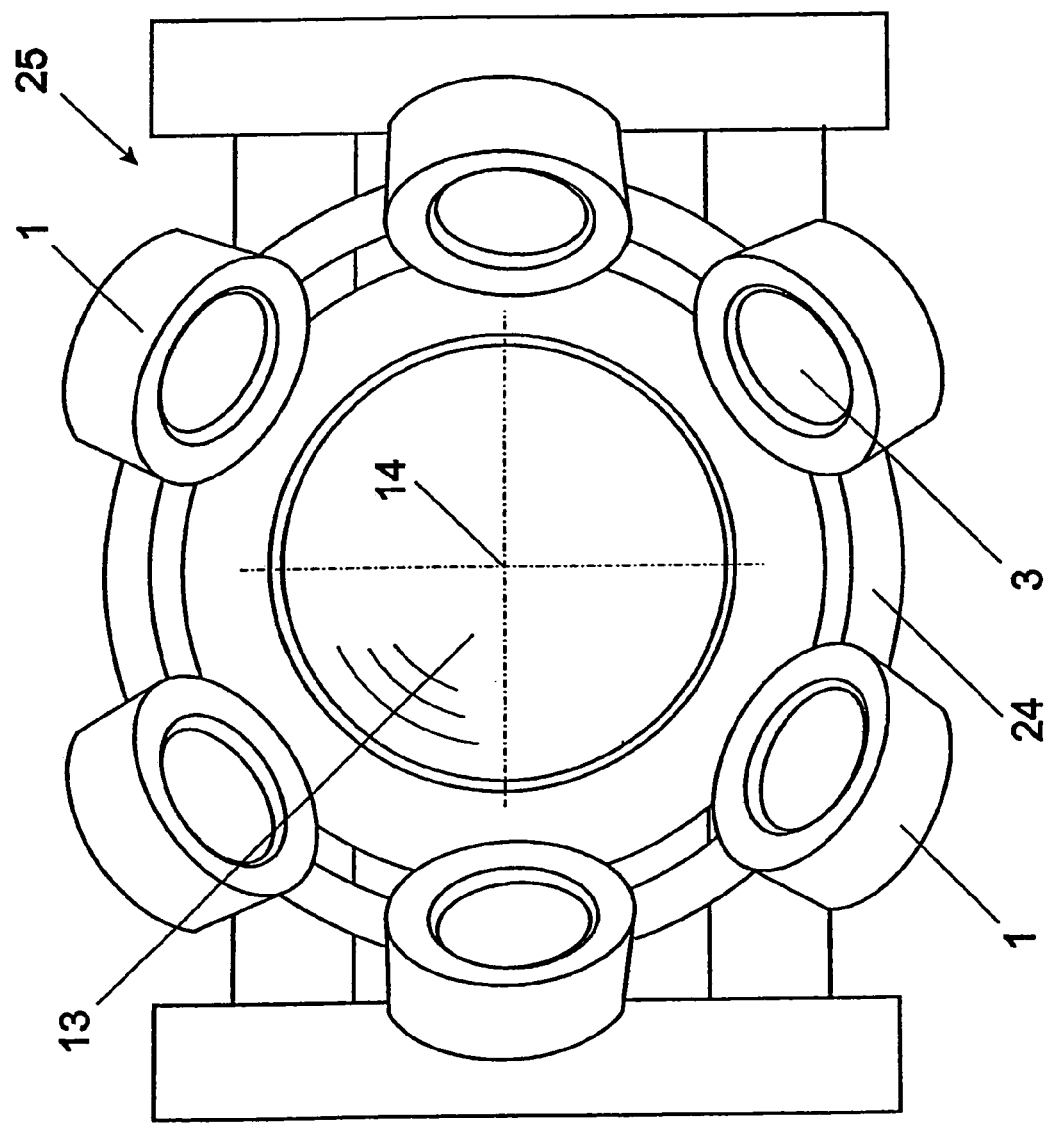
FIG. 4 shows a front view of the underwater lamp according to the invention that is mounted to an underwater camera as a separate component.
Figure 5:
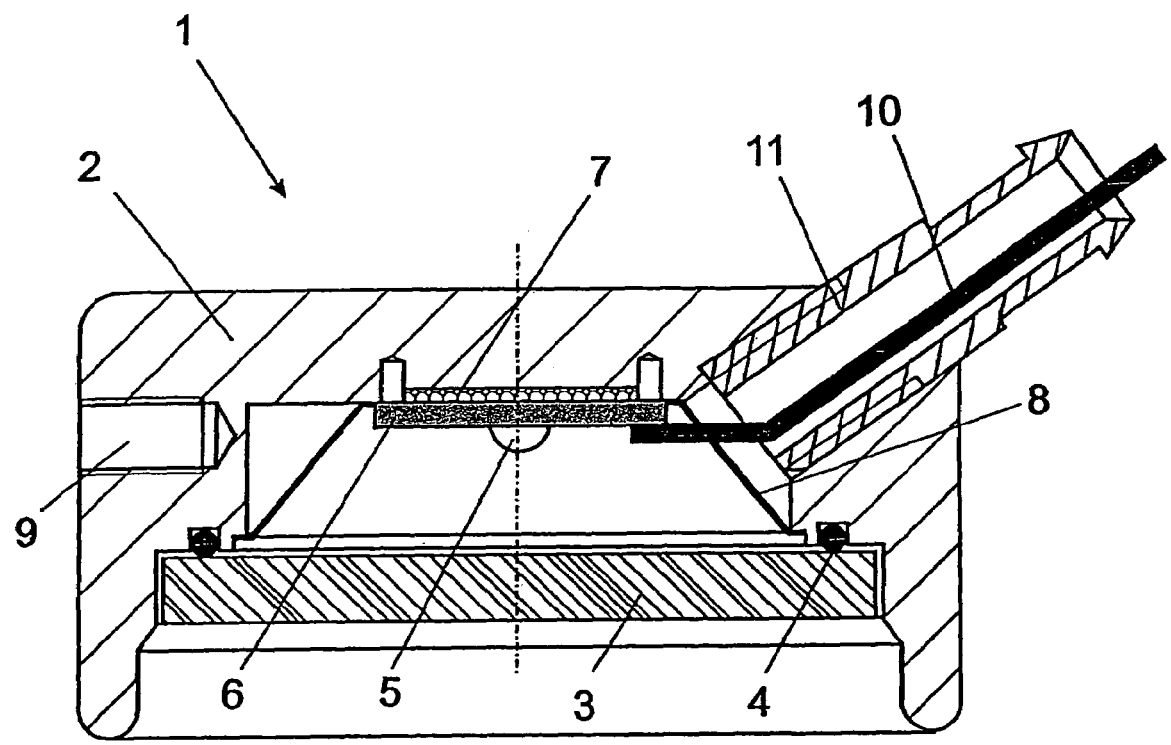
FIG. 5 shows a sectional view of an individual LED lamp.

The LED lamp 1 shown in FIG. 5, a minimum of three of which form an underwater lamp for shots in the macrorange consists of a bowl-type lamp body 2 whose open side is covered by a window 3. An O-ring 4 seals the area between the lamp body 2 and the window 3. The light source is a diode emitting white light 5 that has an output of 1 watt in the embodiment described here. The LED lamp can alternatively be sealed by welding because the LED lamps need not be replaced. The light-emitting diode 5 is mounted to a cooling plate 6 that contacts the lamp body 2 via a cooling paste 7. This allows rapid heat removal from the light-emitting diode 5 to the lamp body 2 that preferably consists of aluminium. The light-emitting diode 5 is surrounded by a reflector 8. The lamp body 2 comprises a tapped hole 9 for fastening the LED lamp 1 to the outer side of a holding ring 24 (FIG. 4) that can be detachably mounted to the front side of the housing of an underwater camera 25 and is arranged concentrically around the front window 13 or around the optical axis 14 of the underwater camera. A minimum of three and a maximum of eight LED lamps 1 are mounted at the same distance from each other around the holding ring—the embodiment shown in FIG. 4 features six LED lamps. The LED lamps may also be connected directly to the housing of the underwater camera or, as the embodiments in FIGS. 1 and 2 show, be integrated into a hollow holding ring 12. However, it is important that the LED lamps 1 are arranged concentrically around the optical axis 14 and in circumferential direction at the same distance from each other with an inclination of about 45° towards the optical axis of the camera lens, as shown in FIG. 4. Power is supplied to each LED lamp via a cable 10 (not shown in FIG. 4) that is conducted into the lamp body 2 via a gland 11.

FIG. 1 gives a schematic sectional view of a section of a holding ring 12 designed as a hollow body in which a LED lamp 1 integrated into the holding ring 12 is located. FIG. 2 shows a complete sectional view of the hollow holding ring 12 in conjunction with an underwater camera that is represented by the dashed line. The hollow holding ring 12 is mounted to the camera housing in a suitable way, e.g. using a clamping device (not shown). The front wall 12a of the holding ring 12 that is concentrically arranged around the front window 13 (port) of the camera housing is inclined at about 45° towards the optical axis 14 of the camera housing so that the LED lamps 1 arranged in a circle at the same distance from each other on the front wall 12a form a dome of light and illuminate a limited area at a high irradiance due to the lateral emission of light and the wide illumination angle of each LED lamp 1. The maximum illumination angle of the light beams 15 produced by the LED lamps 1 is 140°. This specific arrangement of LED lamps with white light-emitting diodes allows to minimize the disadvantages due to light reflection from particles in the water and to illuminate the objects to be photographed in the daylight range at a color temperature of about 5500° K color neutral and basically free of shadows. If another color temperature is required instead of white light, appropriate filters (not shown) can be mounted to the camera lens or the LED lamps 1. The creation mentioned above of a dome of light by LED lamps 1 arranged at an inclination towards the optical axis is advantageous as animals tend to flee to darker areas and retreat towards the dark front window when the underwater lamp concentrically arranged around the front window of the camera is switched on. This gives the user sufficient time to make shots at close range. The view of an underwater lamp according to FIG. 5 is to illustrate the arrangement of the lamp relative to the camera and does not show accessories such as power source, dimming device, or power cable.

In the embodiment shown in FIG. 1, the hollow holding ring 12 is made of plastic and is closed on its rear side by a lid 16 made of aluminium using screwed connections 17 and sealing rings 18. The LED lamp 1 is mounted into an opening of the front side of the holding ring 12 by means of an aluminium plate 20 that is fastened with screwed connections 19. The aluminium plate 20 is connected to the lid 16 by a heat-conducting element to dissipate heat from the aluminium plate 20. A constant-current source 21 consisting of a battery and circuitry that supplies a constant current to the LED lamp independent of operating voltage and applied load is installed in the hollow space of the holding ring 12. This ensures a constant color temperature. The hollow holding ring 12 also houses the required power cables and, in particular, a dimming device (not shown).

Figure 3:
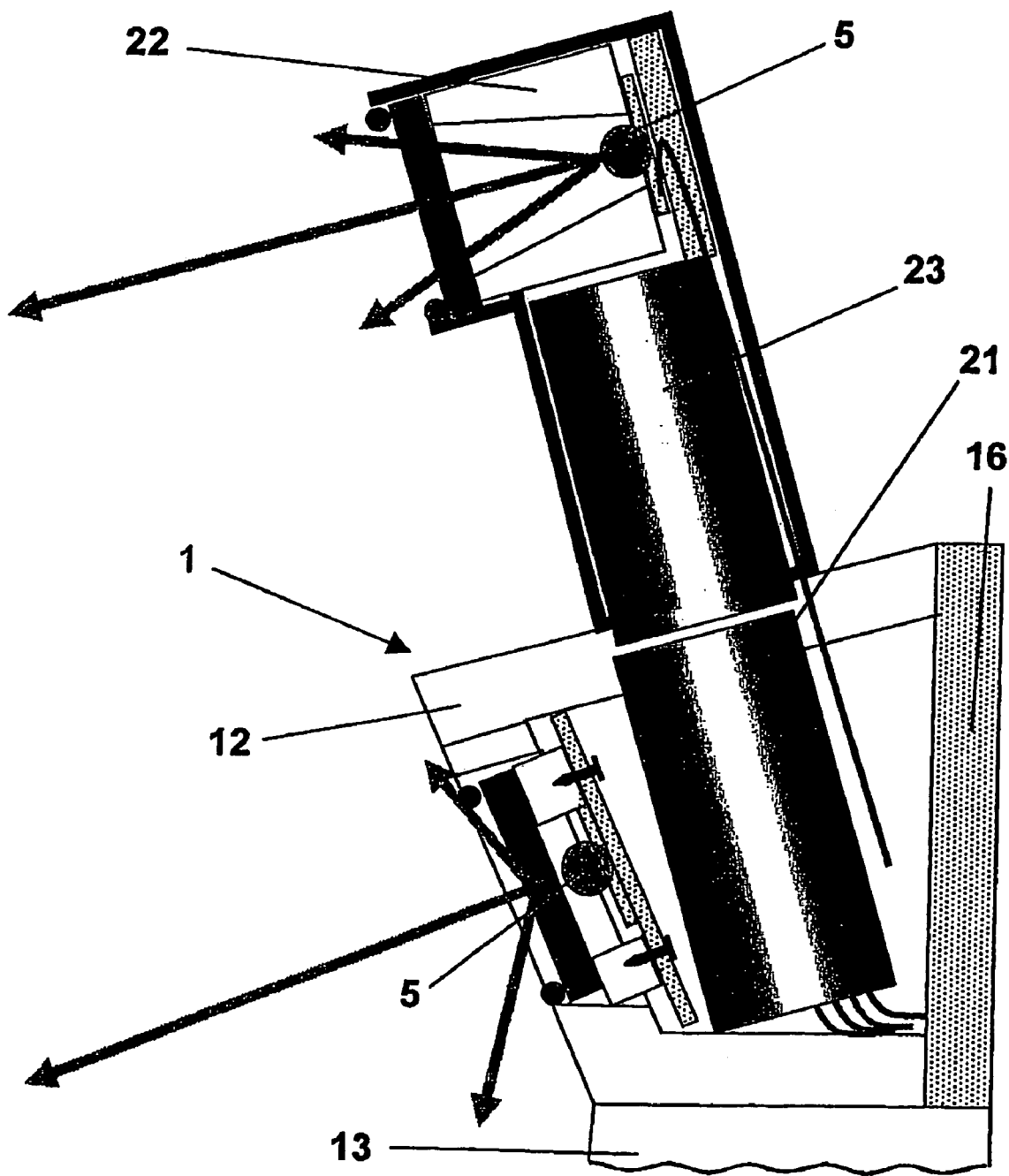
FIG. 3 shows a partial view of the underwater lamp intended for illuminating in the macrorange according to FIGS. 1 and 2 but in addition is equipped with a long-range LED lamp.

The embodiment of an underwater lamp shown in FIG. 3 differs from the embodiment shown in FIGS. 1 and 2 in that an additional long-range LED lamp 22 with a battery 23 is mounted to the holding ring 12, enabling the user to take shots at a longer range than the macrorange of 12 in.

In the present embodiment according to FIG. 5, the underwater lamp 1 includes six LED lamps with an output of 1 watt each. When the lamp is operated using eight rechargeable AA round cells at 1.5 ampere-hours, the full luminosity is available for more than one hour and, unlike when using halogen lamps, the color temperature remains practically constant. Even after two hours, the luminous intensity is still sufficient to illuminate and read instruments at night. It is a safety feature for night diving that luminous intensity declines gradually only.

LIST OF REFERENCE SYMBOLS 1 led lamp
2 lamp body
3 window
4 O-ring
5 light-emitting diode (white light)
6 cooling plate
7 cooling paste
8 reflector
9 tapped hole
10 cable
11 gland
12 hollow holding ring, annular lamp holder 12a front wall of 12
13 front window 14 optical axis
15 light beams
16 lid
17 screwed connection
18 sealing ring
19 screwed connection
20 aluminium plate
21 constant-current source
22 long-range led lamp
23 battery
24 holding ring (solid) (annular lamp holder)
25 underwater camera

The invention claimed is:

1. A lamp for an underwater camera to illuminate and photograph or film objects in the macrorange, characterized in that a minimum of three LED diodes (1) emitting white light are arranged concentrically and at the same distance from each other around, and at a specific angle to, the optical axis (14) of the underwater camera (25), either by means of an annular lamp holder (12, 24) or by directly integrating these lamps into the housing of the camera;

characterized in that each LED lamp (1) is a light-emitting diode (5) that produces white light at a maximum illumination angle of 140° and is arranged and sealed watertight in a housing (2, 3, or 3, 12, 16), and in that the light-emitting diode (5) is mounted onto a cooling plate (6) that is in contact with a housing part (2 or 20, 16) made of heat-conducting material.

2. The lamp according to claim 1, characterized in that the LED lamps (1) are at an angle of inclination of about 45° towards the optical axis (14).

3. The lamp according to claim 1, characterized in that a cooling paste (7) is located between the cooling plate (6) and the heat-conducting material of the housing part (2 or 20).

4. The lamp according to claim 1, characterized in that a battery with a constant-current source (21) is allocated to the LED lamps (1) for power supply.

5. The lamp according to claim 1, characterized in that a dimming device is allocated to the LED lamps (1).

6. The lamp according to claim 1, characterized in that color filters are allocated to the LED lamps and/or the underwater camera.

7. A lamp for an underwater camera to illuminate and photograph or film objects in the macrorange, characterized in that a minimum of three LED diodes (1) emitting white light are arranged concentrically and at the same distance from each other around, and at a specific angle to, the optical axis (14) of the underwater camera (25), either by means of an annular lamp holder (12, 24) or by directly integrating these lamps into the housing of the camera;

characterized in that the LED lamps (1) comprise a lamp body (2) as a housing made of heat-conducting material that is closed by a window (3) and sealed by an O-ring (4) and connected in inclined position with the outer surface of a holding ring (24) that is detachably mounted to the underwater camera (25).

8. A lamp for an underwater camera to illuminate and photograph or film objects in the macrorange, characterized in that a minimum of three LED diodes (1) emitting white light are arranged concentrically and at the same distance from each other around, and at a specific angle to, the optical axis (14) of the underwater camera (25), either by means of an annular lamp holder (12, 24) or by directly integrating these lamps into the housing of the camera;

characterized in that the LED lamps (1) are integrated in an inclined position into a hollow holding ring (12) that is connected to the underwater camera.

9. The lamp according to claim 8, characterized in that the hollow holding ring (12) comprises a plastic housing wherein the LED lamps (1) are located at the front-end, inwardly inclined front wall (12a) in a hole sealed outside by a window (3), and in that the open side of the holding ring (12) and the holes on its opposite side are covered with a lid (16, 20) made of heat-conducting material.

10. The lamp according to claim 9, characterized in that the two lids (16, 20) are connected by a heat-conducting element (26) for heat removal.

11. The lamp according to claim 8, characterized in that the LED lamps (1) are at an angle of inclination of about 45° towards the optical axis (14).

12. The lamp according to claim 8, characterized in that a battery with a constant-current source (21) is allocated to the LED lamps (1) for power supply.

13. The lamp according to claim 8, characterized in that a dimming device is allocated to the LED lamps (1).

14. The lamp according to claim 8, characterized in that color filters are allocated to the LED lamps and/or the underwater camera.

15. A lamp for an underwater camera to illuminate and photograph or film objects in the macrorange, characterized in that a minimum of three LED diodes (1) emitting white light are arranged concentrically and at the same distance from each other around, and at a specific angle to, the optical axis (14) of the underwater camera (25), either by means of an annular lamp holder (12, 24) or by directly integrating these lamps into the housing of the camera;

characterized in that a long-range LED lamp (22) with an LED (5) mounted to a cooling element (6, 7) is fastened to a holding ring (12, 24) and that the LED lamp (22) includes means for focusing the light it emits.

16. The lamp according to claim 15, characterized in that the LED lamps (1) are at an angle of inclination of about 45° towards the optical axis (14).

17. The lamp according to claim 15, characterized in that a battery with a constant-current source (21) is allocated to the LED lamps (1) for power supply.

18. The lamp according to claim 15, characterized in that a dimming device is allocated to the LED lamps (1).

19. The lamp according to claim 15, characterized in that color filters are allocated to the LED lamps and/or the underwater camera.

* * * * *